US006666419B1

(12) United States Patent
Vrame

(10) Patent No.: US 6,666,419 B1
(45) Date of Patent: Dec. 23, 2003

(54) BRACKET ASSEMBLY FOR MOUNTING ELECTRICAL BOX BETWEEN TWO BUILDING STUDS

(75) Inventor: Peter A. Vrame, Elk Grove Village, IL (US)

(73) Assignee: 3244 Corporation, Chicago, IL (US)

( * ) Notice: Subject to any disclaimer, the term of this patent is extended or adjusted under 35 U.S.C. 154(b) by 0 days.

(21) Appl. No.: 09/448,002

(22) Filed: Nov. 23, 1999

(51) Int. Cl.[7] .............................................. E04G 25/00
(52) U.S. Cl. ................ 248/200.1; 248/298.1; 248/906
(58) Field of Search ............................ 248/906, 298.1, 248/200.1

(56) References Cited

U.S. PATENT DOCUMENTS

| 1,288,024 | A | | 12/1918 | Kendig | |
| 2,023,083 | A | * | 12/1935 | Knell | 248/906 X |
| 3,163,386 | A | * | 12/1964 | Collins | 248/200.1 |
| 5,330,137 | A | | 7/1994 | Oliva | |
| 5,386,959 | A | * | 2/1995 | Laughlin et al. | 248/906 X |
| 5,927,667 | A | * | 7/1999 | Swanson | 248/906 X |

* cited by examiner

Primary Examiner—Korie Chan

(74) Attorney, Agent, or Firm—Wood, Phillips, Katz, Clark & Mortimer

(57) ABSTRACT

A bracket assembly is disclosed, which is useful with a combination of an electrical box, a plaster ring, and a fastener or fasteners for fastening the plaster ring to the electrical box, for mounting the combination between two building studs, which are spaced within a range of spacings. The bracket assembly comprises a first bracket and a second bracket, each bracket having a mounting base, which is adapted for mounting to one of the building studs, and each bracket having two parallel legs, which extend from the mounting base of said bracket. At least part of each of the parallel legs of the first bracket is adapted to lie over or under and to slide along at least part of one of the parallel legs of the second bracket, in a telescoping relationship, when the bracket assembly is mounted so that the mounting bases of the brackets are mounted to the building studs, whereby the first and second brackets can be slidably adjusted to accommodate any spacing of the building studs within a range of spacings. The brackets are adapted to mount the combination with the electrical box underlying and engaging two parallel legs among the parallel legs of the first and second brackets, with the plaster ring overlying and engaging two parallel legs among the parallel legs of the first and second brackets. The telescoping relationship is defined by an overlying leg and an underlying leg, the overlying leg having has two spaced flanges, each wrapping partly around the underlying leg.

4 Claims, 2 Drawing Sheets

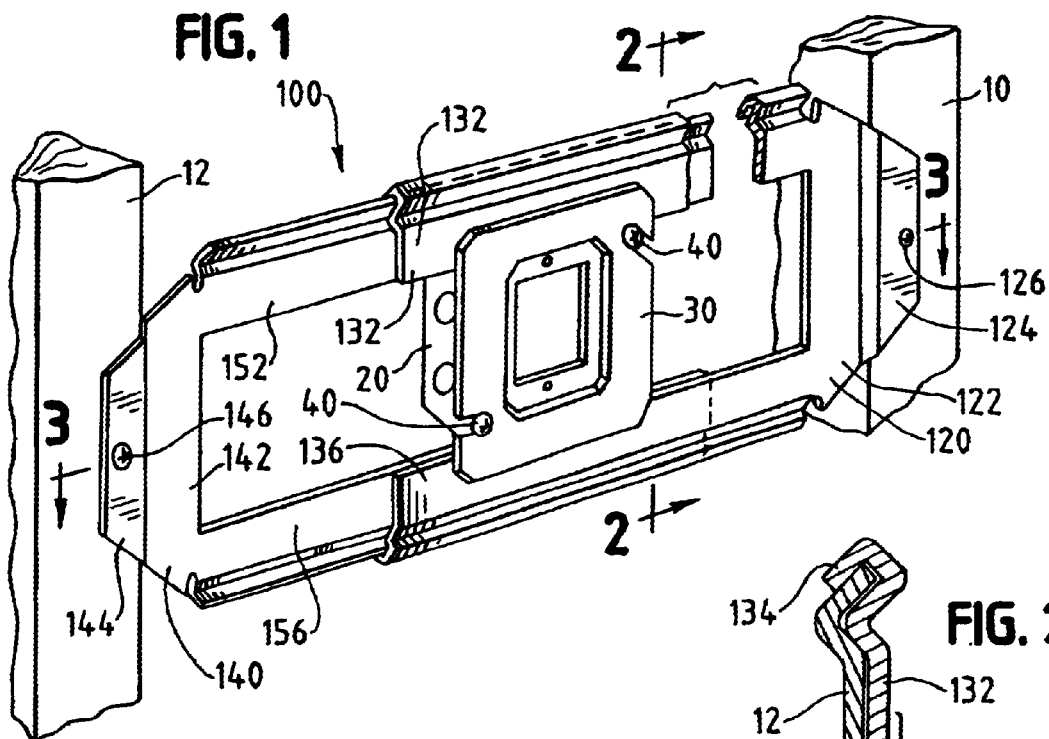
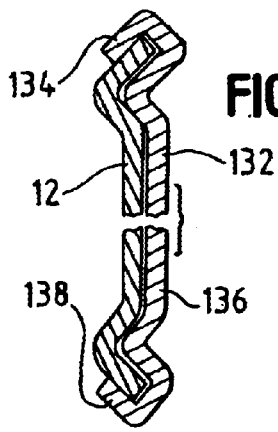
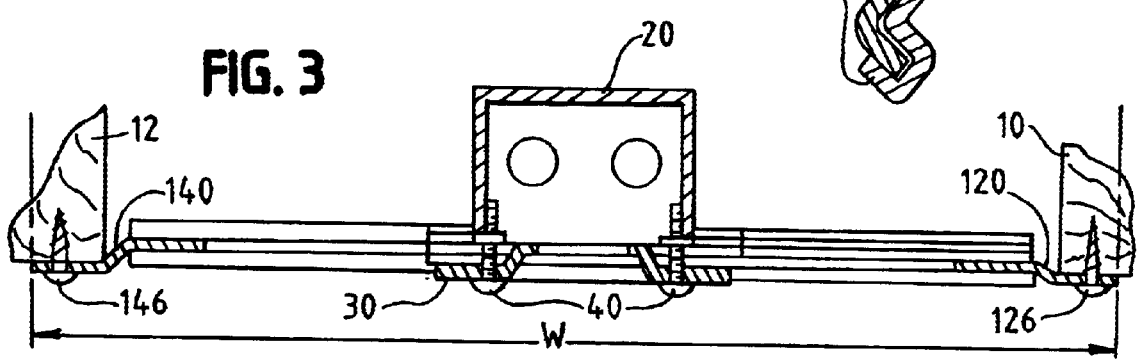
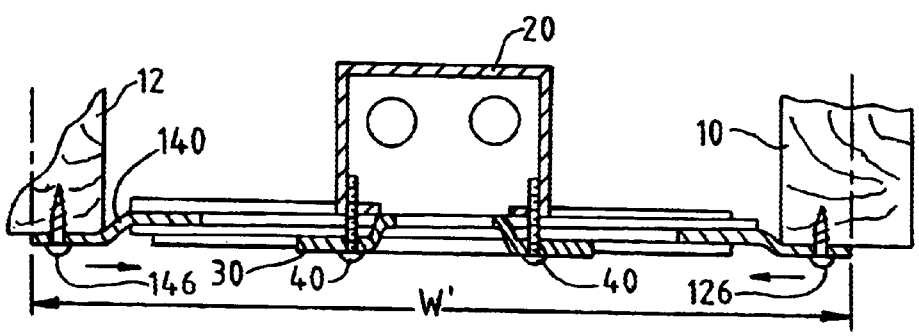

BRACKET ASSEMBLY FOR MOUNTING ELECTRICAL BOX BETWEEN TWO BUILDING STUDS

TECHNICAL FIELD OF THE INVENTION

This invention pertains to a bracket assembly for mounting an electrical box between two building studs. The bracket assembly comprises two brackets, which can be slidably adjusted to accommodate any spacing of the building studs within a range of spacings.

BACKGROUND OF THE INVENTION

In U.S. Pat. No. 5,330,137, a bracket is disclosed for mounting an electrical box between two building studs. The electrical box is provided with a faceplate, which may be also called a mud ring or a plaster ring, and with fasteners for fastening the faceplate to the electrical box. Such a combination of an electrical box, a faceplate, and fasteners is conventional.

The bracket defines a frame, which has two sides, an upper edge, and a lower edge, and to which the electrical box can be adjustably mounted at any location within a wide range of possible mounting locations along the upper and lower edges of the frame. Each of the sides is adapted to be fixedly mounted to one of the building studs.

When the electrical box is mounted, the electrical box is placed under the bracket, a faceplate is placed over the bracket so as to sandwich the upper and lower edges of the bracket between the electrical box and the faceplate, and the fasteners are used to fasten the faceplate to the electrical box with the upper and lower edges of the electrical box sandwiched therebetween.

As disclosed in U.S. Pat. No. 5,330,137, the bracket can be only used if the building studs from each other by a prescribed distance, e.g. 18 inches from stud center to stud center. Hence, such a bracket must be differently sized for different spacings of the building studs from one another, e.g 12 inches from stud center to stud center or 24 inches from stud center to stud center. Further, as disclosed in U.S. Pat. No. 5,330,137, the bracket is not useful for non-standard spacing of the building studs from one another, as near a doorway.

SUMMARY OF THE INVENTION

This invention provides a bracket assembly, which is novel and which provides significant improvements when compared to the bracket disclosed in U.S. Pat. No. 5,330,137, for mounting a combination of an electrical box, a plaster ring, and a fastener or fasteners for fastening the plaster ring to the electrical box, between two building studs.

The bracket assembly comprises two brackets, namely a first bracket and a second bracket, which can be slidably adjusted to accommodate any spacing of the building studs within a range of spacings, e.g. a range from 12 inches from stud center to stud center to 18 inches from stud center to stud center, a range from 18 inches from stud center to stud center to 24 inches from stud center to stud center, or an equivalent range in metric measurements.

Each bracket has a mounting base, which is adapted for mounting to one of the building studs, and each bracket has two parallel legs, which extend from its mounting base. At least part of each of the parallel legs of the first bracket is adapted to lie over or under and to slide along at least part of one of the parallel legs of the second bracket when the bracket assembly is mounted so that the mounting bases of the brackets are mounted to the building studs, whereby the first and second brackets can be slidably adjusted, as mentioned.

In embodiments that are contemplated, each parallel leg of each bracket has a proximal end, at which said parallel leg extends from the mounting base of said bracket, and a distal end, which is not connected to any other part of said bracket except through said parallel leg.

The brackets are adapted to mount the combination with the electrical box underlying and engaging two parallel legs among the parallel legs of the first and second brackets, with the plaster ring overlying and engaging two parallel legs among the parallel legs of the first and second brackets, and with the plaster ring fastened to the electrical box by the fastener or fasteners.

Thus, this invention contemplates an embodiment wherein the brackets are positionable so that at least part of each of the parallel legs of the first bracket is adapted to lie over and to slide along at least part of one of the parallel legs of the second bracket when the bracket assembly is mounted so that the mounting bases of the brackets are mounted to the building studs.

Also, this invention contemplates an embodiment wherein the brackets are positionable so that at least part of a given one of the parallel legs of the first bracket is adapted to lie over and to slide along at least part of a given one of the parallel legs of the second bracket and at least part of the other one of the parallel legs of the first bracket is adapted to lie under and to slide along at least part of the other one of the parallel legs of the second bracket when the bracket assembly is mounted so that the mounting bases of the brackets are mounted to the building studs.

Preferably, in either contemplated embodiment, each of the parallel legs of the first bracket is adapted to interfit slidably in a telescoping relationship with one of the parallel legs of the second bracket, the telescoping relationship being defined by an overlying leg and an underlying leg. The overlying leg of the telescoping relationship may have at least one flange wrapping partly around the underlying leg of the telescoping relationship. Preferably, the overlying leg of the telescoping relationship has two spaced flanges, each wrapping partly around the underlying leg of the telescoping relationship.

This invention also provides a novel combination wherein a bracket assembly, as discussed above, is combined with an electrical box, a plaster ring, and a fastener or fasteners for fastening the plaster ring to the electrical box, each as discussed above.

These and other objects, features, and advantages of this invention are evident from the following description of two contemplated embodiments of this invention, with reference to the accompanying drawings.

BRIEF DESCRIPTION OF THE DRAWINGS

FIG. 1 is a fragmentary, perspective view of a bracket assembly according to one contemplated embodiment of this invention, as mounted between two building studs and combined with an electrical box, a plaster ring, and two fasteners fastening the plaster ring to the electrical box with the parallel legs of the bracket assemble sandwiched between the plaster ring and the electrical box.

FIG. 2, on a larger scale, is a fragmentary, sectional view, as taken along line 2—2 in FIG. 1, in a direction indicated by arrows.

FIG. 3 is a fragmentary, sectional view taken along line 3—3 in FIG. 1, in a direction indicated by arrows, and showing the bracket assembly in an adjusted condition accommodating two comparatively more widely spaced studs.

FIG. 4 is a fragmentary, sectional view similar to FIG. 3 but showing the bracket assembly in an adjusted condition accommodating two comparatively less widely spaced studs.

DETAILED DESCRIPTION OF THE ILLUSTRATED EMBODIMENTS

Figure 5:
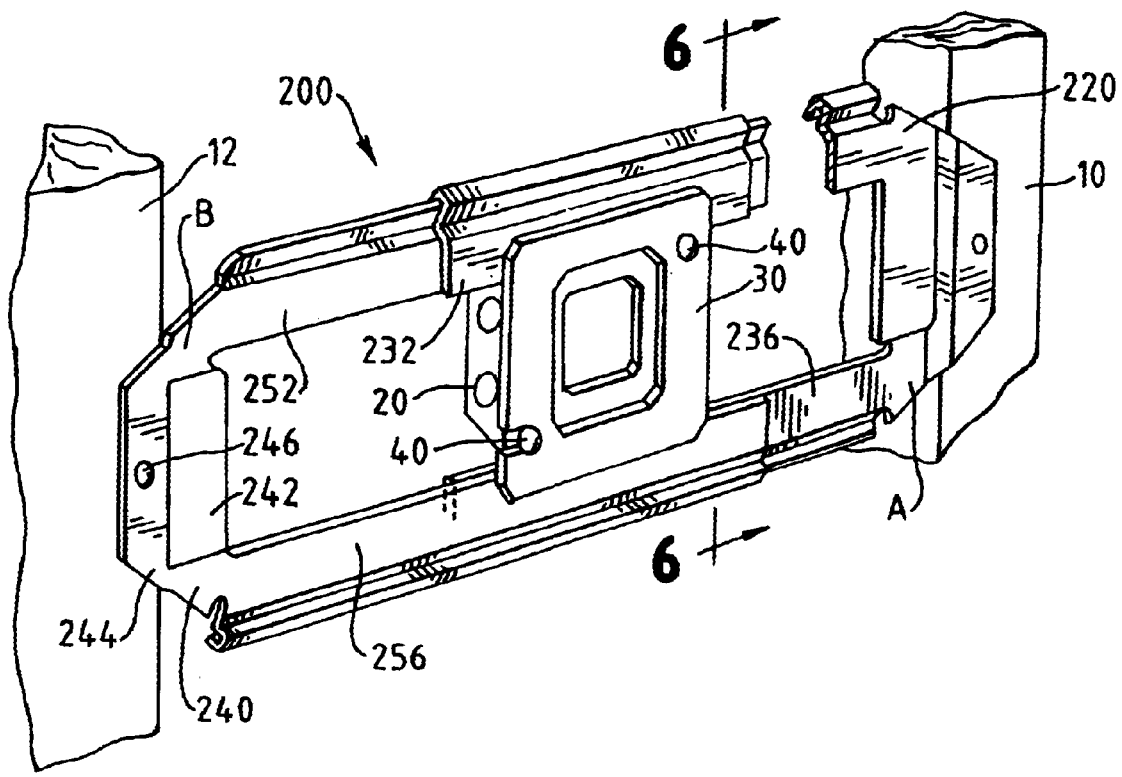
FIG. 5 is a fragmentary, perspective view of a bracket assembly according to another contemplated embodiment of this invention, as mounted between two building studs and combined with an electrical box, a plaster ring, and two fasteners fastening the plaster ring to the electrical box with the parallel legs of the bracket assemble sandwiched between the plaster ring and the electrical box.

As illustrated in FIGS. 1, 2, 3, and 4, a bracket assembly 100 constituting one contemplated embodiment of this invention is mounted between two vertical, wooden, building studs 10, 12, and is used to mount an electrical box 20, a plaster ring 30, and two fasteners 40 for fastening the plaster ring 30 to the electrical box 20. Although vertical studs are illustrated, the bracket assembly can be instead mounted between horizontal studs. Although wooden studs are illustrated, the bracket assembly 100 can be instead mounted between steel studs.

As illustrated, the electrical box 20, the plaster ring 30, and the fasteners 40 are conventional. Because the electrical box 20 can be adjustably mounted at any location within a wide range of possible mounting locations along the bracket assembly 100, via the plaster ring 30 and the fasteners 40, some similarities exist between the bracket assembly 100 and the mounting bracket disclosed in U.S. Pat. No. 5,330,137.

However, whereas the mounting bracket discloses in U.S. Pat. No. 5,330,137 is a unitary piece requiring a prescribed spacing between two building studs, the bracket assembly 100 comprises two brackets, namely a first bracket 120 and a second bracket 140, which can be slidably adjusted to accommodate any spacing of the building studs 10, 12, within a range of spacings, e.g. a range from 12 inches from stud center to stud center to 18 inches from stud center to stud center, a range from 18 inches from stud center to stud center to 24 inches from stud center to stud center, or an equivalent range in metric measurements. Moreover, as contrasted with the mounting bracket disclosed in U.S. Pat. No. 5,330,137, the bracket assembly 100 is useful for non-standard spacing of the building studs 10, 12, as near a doorway.

The first bracket 120 is stamped from sheet metal, galvanized steel being preferred, so as to have a mounting base 122, which has a stepped flange 124 adapting the mounting base 122 for mounting to the building stud 10, via a fastener 126, such as a screw designed for use in wood, and so as to have two parallel legs, namely an upper leg 132 and a lower leg 136, which extend from the mounting base 122. As illustrated in cross-section in FIG. 2, the parallel legs 132, 136, are ribbed so as to resist bending. Moreover, as illustrated therein, the upper leg 132 has a downturned flange 134 and the lower leg 136 has an upturned flange 138.

The second bracket 140 is stamped from sheet metal, galvanized steel being preferred, so as to have a mounting base 142, which has a stepped flange 144 adapting the mounting base 142 for mounting to the building stud 12, via a fastener 146, such as a screw designed for use in wood, and so as to have two parallel legs, namely an upper leg 152 and a lower leg 156, which extend from the mounting base 142. As illustrated in cross-section in FIG. 2, the parallel legs 152, 156, are ribbed so as to resist bending. However, the legs 152, 156, do not have flanges comparable to the flanges 134, 144.

When the bracket assembly 100 is assembled, the upper leg 132 of the first bracket 130 interfits slidably with the upper leg 142 of the second bracket 140, in a telescoping relationship, and the lower leg 136 of the first bracket 130 interfits slidably with the lower leg 156 of the second bracket 140, in a telescoping relationship. Thus, at least a part of the upper leg 132 of the first bracket 120 lies in front of, wraps partly above, below, and around, and slides along at least a part of the upper leg 152 of the second bracket 140, while the downturned flange 134 wraps partly around the upper leg 152 of the second bracket 140. Also, at least a part of the lower leg 136 of the first bracket 120 lies in front of wraps partly above, below, and around, and slides along at least a part of the lower leg 156 of the second bracket 140, while the upturned flange 138 wraps partly around the lower leg 156 of the second bracket 140.

As illustrated in FIG. 3, the brackets 120, 140, can be slidably adjusted to accommodate the building studs 10, 12, being comparatively more widely spaced e.g by a spacing W of 24 inches from stud center to stud center. As illustrated in FIG. 4, the brackets 120, 140, can be slidably adjusted to accommodate the building studs 10, 12, being comparatively less widely spaced ,e.g. by a spacing W' of 18 inches from stud center to stud center. Moreover, the brackets 120, 140, can be slidably adjusted to accommodate the building studs 10, 12, being intermediately spaced, e.g. by 21 inches from stud center to center.

When the electrical box 20 is mounted to the bracket assembly 100, via the plaster ring 30 and the fasteners 40, the electrical box 20 is placed so as to lie under (i.e. cover the back of) and so as to engage whichever of the parallel legs of the brackets 120, 140, are exposed at the back of the bracket assembly 100, at the location selected for mounting the electrical box 10. Next, the plaster ring 30 is placed so as to engage whichever of the parallel legs of the brackets 120, 140, are exposed at the front of the bracket assembly 100, at the location selected for mounting the electrical box 10. Next, the fasteners 40 are used to fasten the plaster ring 30 to the electrical box 20, whereby whichever of the parallel legs are engaged by the plaster ring 30 and by the electrical box 10 are sandwiched between the plaster ring 30 and the electrical box 10.

As illustrated in FIG. 3 and as illustrated in FIG. 4, the electrical box 10 lies under and engages the parallel legs 142, 146, of the second bracket 140 and the plaster ring 30 lies over and engages the parallel legs 132, 136, of the first bracket 120. As illustrated in FIG. 3, if the electrical box were moved to the leftmost of its possible locations along the bracket assembly 100, both the electrical box 10 and the plaster ring 30 would engage the parallel legs 142, 146, of the second bracket 140 but would not engage the parallel legs 134, 136, of the first bracket 120.

Figure 6:
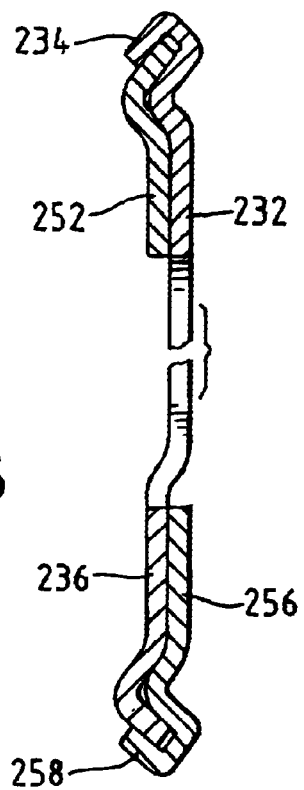
FIG. 6, on a larger scale, is a fragmentary, sectional view taken along line 6, in a direction indicated by arrows.

As illustrated in FIGS. 5 and 6, a bracket assembly 200 constituting another contemplated embodiment of this invention is mounted between the building studs 10, 12, and is used to mount the electrical box 20, the plaster ring 30, and the fasteners 40 for fastening the plaster ring 30 to the electrical box 20. Except as illustrated and described herein, the embodiment of FIGS. 5 and 6 is similar to the embodiment of FIGS. 1, 2, 3, and 4 and is combined similarly with the electrical box 20, the plaster ring 30, and the fasteners 40. The bracket assembly 100 comprises two brackets, namely a first bracket 220 and a second bracket 240, which can be slidably adjusted to accommodate any spacing of the building studs 10, 12, within a range of spacings. The first bracket 220 and the second bracket 240, as made, may be substantially identical to each other.

The first bracket 220 is stamped from sheet metal, galvanized steel being preferred, so as to have a mounting base 222, which has a stepped flange 224 adapting the mounting base 222 for mounting to the building stud 10, via a fastener 226, such as a screw designed for use in wood, and so as to have two parallel legs, namely an upper leg 232 and a lower leg 236, which extend from the mounting base 222. As illustrated in cross-section in FIG. 5, the parallel legs 232, 234, are ribbed so as to resist bending. Moreover, as illustrated therein, the upper leg 232 has a downturned flange 234. However, the lower leg 234 does not have an upturned flange comparable to the upturned flange 138 of the embodiment of FIGS. 1, 2, 3, and 4. As compared to the upper leg 232, the lower leg 236 is offset slightly to the back, at a step A.

The second bracket 240 is stamped from sheet metal, galvanized steel being preferred, so as to have a mounting base 242, which has a stepped flange 244 adapting the mounting base 242 for mounting to the building stud 12, via a fastener 246, such as a screw designed for use in wood, and so as to have two parallel legs, namely an upper leg 252 and a lower leg 256, which extend from the mounting base 242. As illustrated in cross-section in FIG. 6, the parallel legs 252, 256, are ribbed so as to resist bending. Moreover, as illustrated therein, the lower leg 246 has an upturned flange 258. However, the upper leg 252 does not have a downturned flange comparable to the downturned flange 134 of the embodiment of FIGS. 1, 2, 3, and 4. As compared to the lower leg 244, the upper leg 252 is offset slightly to the back, at a step B.

When the bracket assembly 200 is assembled, the upper leg 232 of the first bracket 230 interfits slidably with the upper leg 252 of the second bracket 240, in a telescoping relationship, and the lower leg 236 of the first bracket 230 interfits slidably with the lower leg 256 of the second bracket 240, in a telescoping relationship. Thus, at least a part of the upper leg 232 of the first bracket 220 lies over (i.e. covers the front of) and slides along at least a part of the upper leg 252 of the second bracket 240, while the downturned flange 234 wraps partly around the upper leg 252 of the second bracket 240. Also, at least a part of the lower leg 236 of the first bracket 220 lies under (i.e. covers the back of) and slides along at least a part of the lower leg 256 of the second bracket 240, while the upturned flange 258 wraps partly around the lower leg 236 of the first bracket 220.

When the electrical box 20 is mounted to the bracket assembly 200, via the plaster ring 30 and the fasteners 40, the electrical box 20 is placed so as to lie under (i.e. cover the back of) and so as to engage whichever of the parallel legs of the brackets 220, 240, are exposed at the back of the bracket assembly 200, at the location selected for mounting the electrical box 10. Next, the plaster ring 30 is placed so as to engage whichever of the parallel legs of the brackets 220, 240, are exposed at the front of the bracket assembly 200, at the location selected for mounting the electrical box 10. Next, the fasteners 40 are used to fasten the plaster ring 30 to the electrical box 20, whereby whichever of the parallel legs are engaged by the plaster ring 30 and by the electrical box 10 are sandwiched between the plaster ring 30 and the electrical box 10. Because of the offsets at the steps A, B, the plaster ring 30 is mounted vertically, not canted.

Various modifications may be possibly made in either of the illustrated embodiments, as described above, without departing from the scope and spirit of this invention.

What is claimed is:

1. For mounting between two building studs, which are spaced within a range of spacings, a combination comprising an electrical box, a plaster ring, a fastener or fasteners for fastening the plaster ring to the electrical box, and a bracket assembly, wherein the bracket assembly comprises a first bracket and a second bracket, each bracket having a mounting base, which is adapted for mounting to one of the building studs, each bracket having two parallel legs, which extend from the mounting base of said bracket, wherein each parallel leg of each bracket has a proximal end, at which said parallel leg extends from the mounting base of said bracket, and a distal end, which is not connected to any other part of said bracket except through said parallel leg, wherein the first and second brackets are positioned so that at least part of each of the parallel legs of the first bracket lies in front or back of, wraps partly above, below, and around and is adapted to slide along at least part of one of the parallel legs of the second bracket when the mounting bases are mounted to the building studs, the first and second brackets being slidably adjustable with infinite adjustability to accommodate any spacing of the building studs within a range of spacings, wherein the electrical box lies under and engages two parallel legs among the parallel legs of the first and second brackets, the plaster ring overlies and engages two parallel legs among the parallel legs of the first and second brackets, and the plaster ring is fastened to the electrical box by the fastener or fasteners.

2. The combination of claim 1 wherein the plaster ring is fastened to the electrical box by the fastener or fasteners with the fastener or fasteners passing between the parallel legs engaged by the plaster ring and the parallel legs engaged by the electrical box, and wherein the parallel legs engaged by the plaster ring and the parallel legs engaged by the electrical box are clamped between the plaster ring and the electrical box.

3. For mounting between two building studs, which are spaced within a range of spacings, a combination comprising an electrical box, a plaster ring, a fastener or fasteners for fastening the plaster ring to the electrical box, and a bracket assembly, wherein the bracket assembly comprises a first bracket and a second bracket, each bracket having a mounting base, which is adapted for mounting to one of the building studs, each bracket having two parallel legs, which extend from the mounting base of said bracket, wherein each parallel leg of each bracket has a proximal end, at which said parallel leg extends from the mounting base of said bracket, and a distal end, which is not connected to any other apart of said bracket except through said parallel leg, wherein the first and second brackets are positioned so that at least part of each of the parallel legs of the first bracket lies in front of, wraps partly above, below, and around and is adapted to slide along at least part of one of the parallel legs of the second bracket when the mounting bases are mounted to the building studs, the first and second brackets being slidably adjustable with infinite adjustability to accommodate any spacing of the building studs within a range of spacings, wherein the electrical box lies under and engages two parallel legs among the parallel legs of the first and second brackets, the plaster ring overlies and engages two parallel legs among the parallel legs of the first and second brackets, and the plaster ring is fastened to the electrical box by the fastener or fasteners.

4. The combination of claim 3 wherein the plaster ring is fastened to the electrical box by the fastener or fasteners with the fastener or fasteners passing between the parallel legs engaged by the plaster ring and the parallel legs engaged by the electrical box, and wherein the parallel legs engaged by the plaster ring and the parallel legs engaged by the electrical box are clamped between the plaster ring and the electrical box.

* * * * *